350-376

SR X4029D WP

XR 3,555,556

SEARCH ROOM (3)

Jan. 12, 1971 G. R. NACCI 3,555,556

THERMOMAGNETIC RECORDING

Filed Nov. 27, 1968 3 Sheets-Sheet 1

3555556

OR IN 346/74.1

INVENTOR.
GEORGE RAYMOND NACCI

United States Patent Office 3,555,556

Patented Jan. 12, 1971

3,555,556

THERMOMAGNETIC RECORDING

George Raymond Nacci, Fairfax, Wilmington, Del., assignor to E. I. du Pont de Nemours and Company, Wilmington, Del., a corporation of Delaware Continuation-in-part of application Ser. No. 636,729, May 8, 1967, which is a continuation-in-part of application Ser. No. 409,885, Nov. 9, 1964. This application Nov. 27, 1968, Ser. No. 779,393

Int. Cl. G01d *15/12;* G11b *5/62, 7/02*

U.S. Cl. 346—74 50 Claims

ABSTRACT OF THE DISCLOSURE

High quality thermomagnetic recording can be achieved by imaging a document onto a magnetic recording member with a flash of light. The magnetic recording member is composed of fine particles of hard magnetic material and is exposed under magnetic conditions such that a change of magnetic state occurs on heating. Preferably the recording member is premagnetized and imagewise demagnetized. The member can be thermally biased by a second flash of light.

RELATED APPLICATIONS

This application is a continuation-in-part of copending application Ser. No. 636,729 filed May 8, 1967, now abandoned which is a continuation-in-part of the then copending application Ser. No. 409,885 filed Nov. 9, 1964, and now abandoned.

BACKGROUND OF THE INVENTION

(1) Field of the invention

This invention relates to thermomagnetic recording of information on documents.

(2) The prior art

U.S. Pats. 2,915,594 to Burns et al. and U.S. 2,793,135 to Sims et al. describe the recording of optical images on magnetic media. The present invention is directed to improved methods in the magnetic recording of optical images to obtain high quality magnetic images.

SUMMARY OF THE INVENTION

The process of the present invention can be defined as a thermomagnetic recording process which comprises:

(i) Placing a document having a message defined by areas of differing transmissivity to light between a light source and a recording member;

(ii) Exposing said recording member to a flash of light from said source having a duration less than 10 milliseconds through said document, said magnetic recording member comprising a particulate magnetic material, the particles of said material being capable of magnetization to a hard magnetic state, in a stratum, preferably having a thickness of 0.01 to 5 mils, bound to a support, said particles having a particle size with a maximum dimension in the range of 0.01 to 10 microns, the intensity and duration of said flash being sufficient to raise the temperature of said magnetic material imagewise above a transition temperature defined by the lower temperature limit of a magnetic transition in accordance with the modulation of the light by transmission through said document while the remainder of said recording member is maintained below the transition temperature, under magnetic conditions which change the magnetic state of said magnetic material on heating above and cooling through said transition temperature; and (iii) Cooling the magnetic material below the transition temperature and thereby fixing the magnetic image.

Alternatively, instead of exposing the magnetic recording member to the light transmitted by the document, the document can be illuminated by a flash of light and the light modulated by reflection from the document can be focussed on the recording member by a lens.

Preferably the magnetic recording member is premagnetzied, and, as will appear more fully, it is desirable that the magnetic recording member be magnetized patternwise. The recording member is then imagewise heated and cooled through a transition temperature defined by the lower temperature limit of the Curie temperature range.

The temperature at which the recording member is maintained is necessarily below the lower temperature limit of the Curie temperature range, and in general below the lower temperature limit of the magnetic transition involved in the imaging process. This temperature may be room temperature. On the other hand other temperatures can be employed, depending on the Curie temperature of the magnetic material and such factors as the contrast or gray scale desired in the copy as will be more fully discussed hereinafter. Transient thermal biasing can also be applied by a second flash of light timed to expose the record member and heat the particulate material of the same to the desired bias temperature at the same time as the magnetic material is imagewise heated by the light modulated by the document.

THE DRAWINGS AND DETAILED DESCRIPTION OF THE INVENTION

This invention will be better understood by reference to the accompanying drawings. In these drawings FIG. 1 is a diagram of apparatus for recording a magnetic image on a recording member by transmission through a document.

Figure 1:
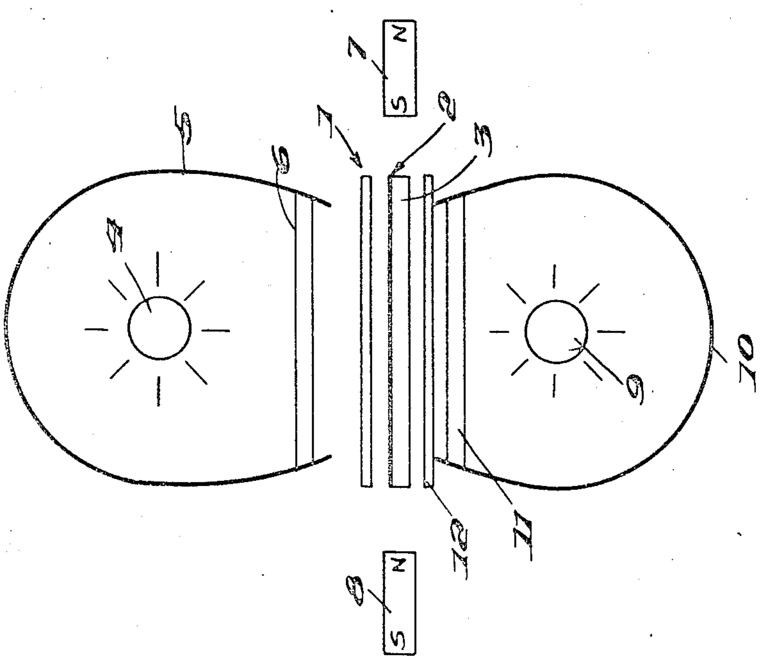

Referring to the drawings, FIG. 1 shows a diagram of apparatus which can be employed to form a magnetic image corresponding to the optical image transmitted by a document. The document 1, which is suitably a photographic transparency, is placed over the recording member, which comprises an opaque stratum of a magnetic material such as chromium dioxide, 2, mixed with a binder, doctored over the surface of a transparent support member 3 and then cured to bind the magnetic material to the support. The document is preferably touching the recording member. A flash of light of short duration is provided by a xenon flash lamp 4 which is contained in a reflective housing 5. A suitable filter 6 can be placed at or near the mouth of housing 5 to limit the spectral output of the flash lamp. Light from the flash lamp passes through the document and is modulated by the image on the document so that the portions of the recording member adjacent to the most transmissive areas receive the greatest amount of light. The light image is absorbed by magnetic material of the recording member which is accordingly heated imagewise. If the magnetic recording member is premagnetized in a selected direction, and the intensity and duration of the flash of light are sufficient to heat the magnetic material opposite the more transmissive regions of the document into the Curie range of temperature, a magnetic image will be formed in which the portions of the surface of the magnetic material adjacent to the less transmissive portions of the document remain magnetized while the portions adjacent to the more transmissive portions are demagnetized.

In another embodiment of the invention exemplified by FIG. 1 also, the magnetic member is unmagnetized and is placed in a magnetic field having a strength less than the coercivity of the magnetic material forming the opaque stratum over the surface of the magnetic recording member. Thus the magnetic recording member can have a magnetic stratum 2 in which the magnetic material is chromium dioxide having a coercivity of 300 oe. at ambient temperature and is maintained in a field of about 150 oe. supplied by two permanent magnets 7 and 8 adjacent to the recording member. When the magnetic material is imagewise momentarily heated to a temperature at which the coercivity of the magnetic material in the heated portions of the recording member is less than the field strength of the magnet and then cooled in the magnetic field, a magnetic image is formed over the recording member in which the portion of the recording member adjacent to the more transmissive portions of the document are magnetized.

In yet another embodiment also described by FIG. 1, the magnetic recording member is premagnetized, so that, as shown in FIG. 1, the direction of magnetization is opposite to the magnetic field of magnets 7 and 8, i.e., the direction of magnetization of the magnetic material is in the plane of the member with the south poles directed towards magnet 7 and the north poles directed towards magnet 8. On exposure such that the coercivity of the magnetic material becomes less than the field strength of the magnet in the regions of the recording member heated by the light and subsequent cooling, a magnetic image having a polarity of opposite sign to that of the less heated regions of the recording member is formed.

As will be explained more fully hereinafter, imaging on the recording member takes place in a relatively narrow range of temperature which may be substantially above room temperature. The successful copying of gray scale, or conversely increasing contrast of the magnetic image in comparison with the original depends on the initial temperature of the magnetic material with respect to this range. The magnetic recording member can be maintained at some bias temperature either greater or less than room temperature to permit control of gray scale or contrast. However, heat bias can be supplied to the magnetic material rather than to the whole recording member by a second flash lamp, which is operated at the same time as the imaging flash 4.

In FIG. 1 the biasing flash lamp is a second xenon flash lamp indicated by 9. Flash lamp 9 is likewise provided with a reflector 10 and optionally with a filter 11. The biasing flash passes through the transparent support 3 and heats the magnetic material in the stratum 2 to the desired bias temperature while the cooperative effect of lamp 4 raises the temperature of the recording member imagewise to the transition temperature at which imaging occurs.

The biasing flash can likewise be modulated by a transparency so that bias is only applied in selected regions, and the image hence recorded only in those regions. Such modulation can be achieved by a suitable transparency 12 placed between the bias flash lamp 9 and the recording member. Thus information can be deleted from the image of the document as desired.

Alternatively, the biasing flash can be modulated by transparency 12 to raise imagewise the temperature of portions of the recording member above the transition temperature while other portions are raised to a suitable bias temperature for the imaging flash from lamp 4. In this way, additional information to that contained in the document 1 can be added to the magetic image formed.

The biasing flash can likewise be modulated to effect a magnetic structuring of the image.

Figure 2:
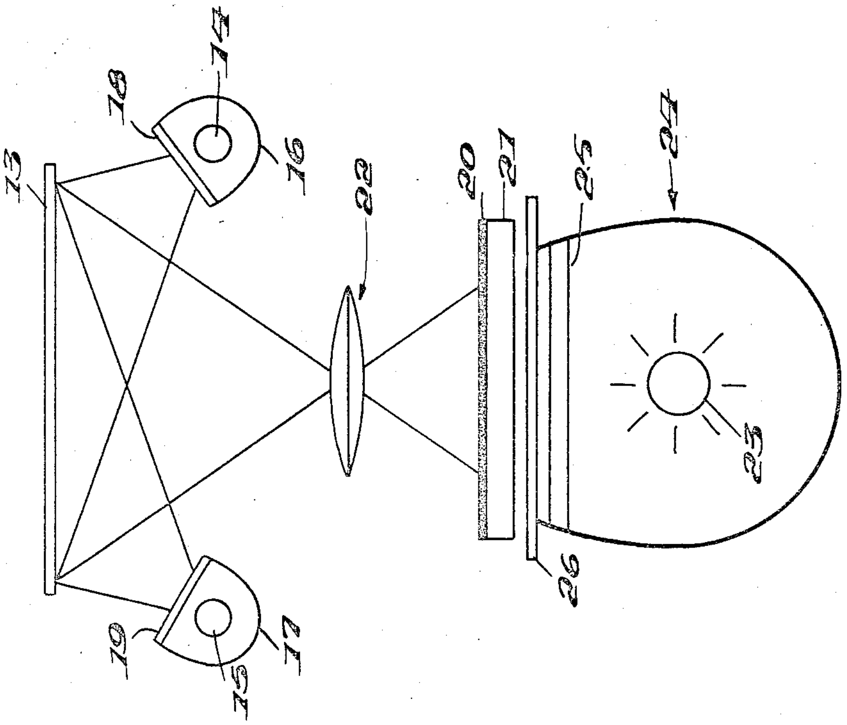
FIG. 2 is a diagram of apparatus which can be used to form a magnetic image on a recording member by episcopic projection.

Referring now to FIG. 2, there is shown a schematic diagram of apparatus which can be used for the episcopic recording of images by reflective projection. In this mode of operation, the document 13 has a message on its surface which is selectively reflective of light such as a sheet of white paper with a printed message thereon. The document is momentarily illuminated with a flash of light from xenon lamps 14 and 15 which are disposed to provide substantially uniform illumination over the surface of the document. The lamps are contained in reflective housings 16 and 17 which may be equipped with filters 18 and 19 to select the desired spectral range of the light employed for imaging. The housings in this case further serve to screen the recording member, which is composed of an opaque stratum of a particulate magnetic material such as chromium dioxide 20 bound on a transparent support 21, from the direct flash of the lamps. The modulated light reflected from the document is focussed onto the recording member by a lens 22 to form a magnetic image on the recording member. Flash biasing can be supplied, if desired by xenon flash lamp 23 which is contained in a housing 24 optionally equipped with a filter 25 and a secondary, modulating means 26. The methods of forming the magnetic image and of flash biasing are as described for FIG. 1.

In all of the embodiments of this invention, a thermal image is formed in the stratum of magnetic material. This thermal image is transient and is rapidly destroyed by thermal conduction to the substrate and to the binder and to the surrounding magnetic material. Since the time required to effect the desired magnetic changes is very short, it is desirable that the thermal image persist no longer than is needed to heat the magnetic particles momentarily to the desired imaging temperature. Prolonged exposure leads to diffusion of the thermal image and loss of image quality. In the above described processes, the magnetic particles are heated rather than the whole recording member, and in view of the thin startum of magnetic material which is employed are cooled by conduction to the substrate which remains substantially unheated. Accordingly, the magnetic image is rapidly fixed by the cooling process. By this means, extremely high resolution imaging can be achieved, close to the ultimate limits which are set by the domain size defined by the fineness of the particles.

The magnetic image is permanent and can be read out by magnetic inks, toners, by magneto-optic methods utilizing the Kerr effect, by recording heads or the like repeatedly without destruction of the image. On the other hand the magnetic image can be destroyed and the magnetic recording member returned to its initial state by remagnetizing the recording member or by demagnetizing the recording member with a collapsing A.C. magnetic field.

Figure 3:
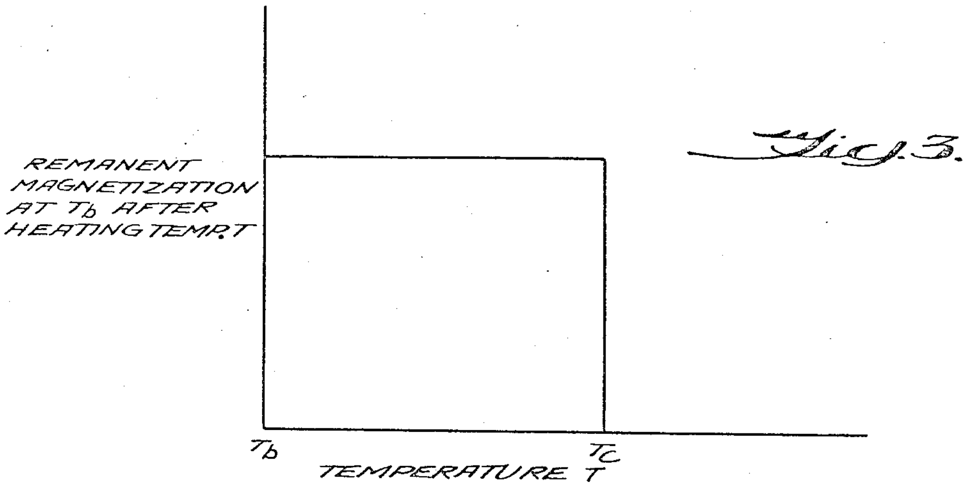
FIG. 3 is a curve of the remanent magnetization at $T_b$ of an ideal particulate magnetic material after heating to T and cooling.

FIG. 3 of the accompany drawings shows a curve of the remanent magnetization measured at a base temperature $T_b$ for an assembly of uniform ideal magnetic particles, magnetized to a predetermined level. If the particles are heated to a temperature T above $T_b$ and the magnetization is measured after cooling back to $T_b$, no change occurs unless T exceeds $T_c$, the Curie temperature, in which case the remanent magnetization is zero. In one embodiment of the present invention, the recording member is magnetized prior to exposure to the pulse of exposing light modulated by transmission through the document. The portions of the document corresponding to the areas of greatest transmission are thus selectively heated. If the recording member were ideal having a curve of remanent magnetization versus temperature as shown in FIG. 3, and if the heating were sufficient to raise the temperature of the portions of the recording member in an imagewise relationship to more transmissive areas to a temperature above $T_c$, a magnetic image would be formed. In this mode of operation the transition temperature is the Curie temperature.

Figure 4:
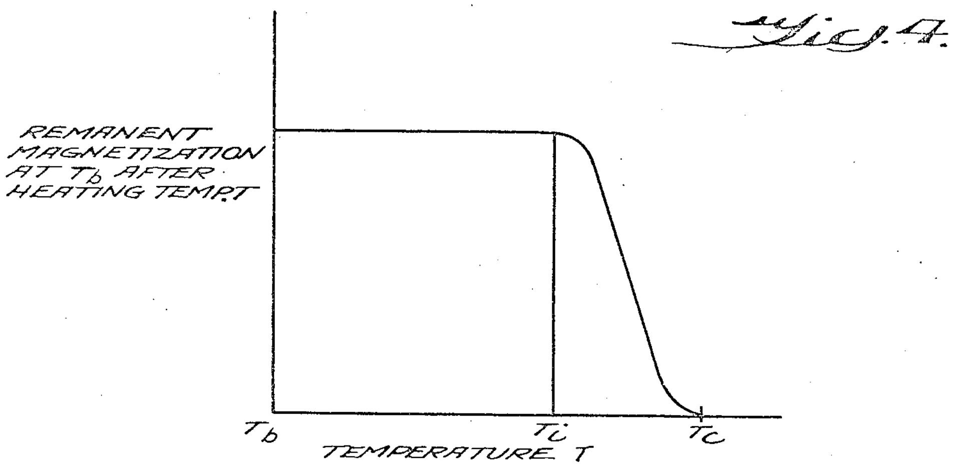
FIG. 4 is a curve showing the remanent magnetization of the magnetized partculate magnetic material measured at $T_b$ as a function of the temperature to which it is heated and then cooled.

FIG. 4 of the accompanying drawings shows a curve of the remanent magnetization measured at $T_b$ versus tempertaure to which the magnetic material has been heated and then cooled which is typical of an actual magnetic material. Because the particles vary in geometry and chemical composition, the value of the remanent magnetization does not decrease to zero at a sharply defined Curie temperature, but rather over a short range of temperature, generally of the order of a few degrees, which can be called for convenience the Curie range. The relevant temperature for imaging in the above described process of demagnetizing a premagnetized recording member is the temperature $T_i$ shown on the curve, FIG. 4, which is the lower temperature limit of the range of temperatures over which the Curie transition takes place. If the process of the present invention is operated so that the light transmitted by the least transmissive parts of the document heat the recording member to about $T_i$; whereas, the transmission of the more transmissive parts of the document heats the recording member to a point just sufficient for complete demagnetization of the recording member, then it is possible to reproduce a gray scale by the process of the present invention.

The above method of recording is conducted in the absence of an applied magnetic field external to the recording member. The optional presence of magnetic fields in the process of the present invention modifies the requirements for image formation.

Figure 5:
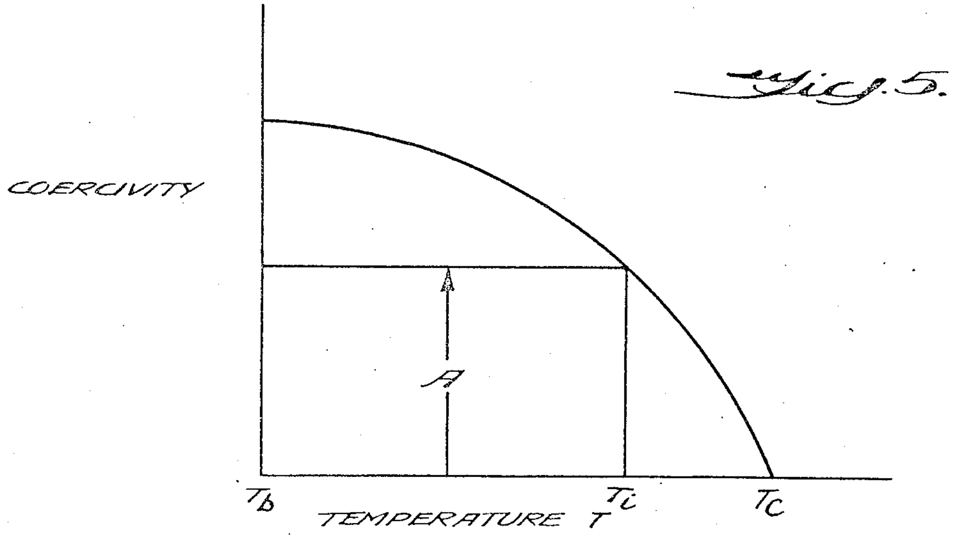
FIG. 5 is a curve showing the coercivity of hard particulate magnetic material as a function of temperature.
Figure 6:
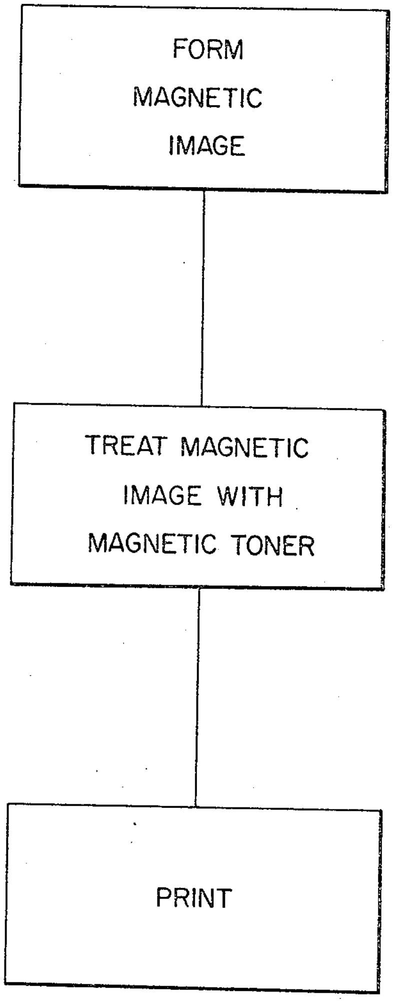
FIG. 6 is a block diagram showing read-out with a magnetic toner.

FIG. 5 is a graphical representation of the coercivity of a typical magnetic material as a function of temperature. The curve shown varies not only with the nature of the ferromagnetic material employed in the recording member but also on the history of the sample and the nature of the magnetic fields employed for measurement. At the Curie temperature the coercivity is zero. Consider the process of recording, employing an unmagnetized recording member in the presence of a weak D.C. field. The coercivity of the magnetic material varies with temperature as shown in FIG. 5. When the temperature is momentarily raised above the point $T_i$ in FIG. 5 at which the strength of the field exceeds the coercivity, the recording member is magnetized. Accordingly, the temperature $T_i$ can be regarded in the same light as $T_i$ in FIG. 4, namely as the lower temperature limit of a magnetic transition under the selected conditions of field.

It will be appreciated that the initial temperature, $T_b$, can be room temperature or can be some temperature other than room temperature, i.e., the temperature of the recording member can be maintained at some temperature other than room temperature by heating or cooling means such as a stream of air at a controlled temperature, by electrical heating means, or other methods of controlling the temperature of materials which will be known to those skilled in the art.

Referring to FIG. 4, when the temperature, $T_b$ at which the recording member is maintained is approximately equal to the lower temperature limit of the magnetic transition, $T_i$, and the modulation and intensity of the light employed to form the heat image is such that the range of heating is between $T_i$ and $T_c$, the premagnetized recording member will be demagnetized substantially in proportion to the transmissivity or reflectively of the document. That is to say, the system is capable of recording gray scale.

If the temperature at which the recording member is maintained is decreased below $T_i$, the recording will increase in contrast, i.e., smaller degrees of modulation of the light are required to drive the recording member from its premagnetized condition to a completely demagnetized condition. It will be evident that the total energy of the pulse or flash of light must be increased in proportion to $T_c-T_b$.

In the above system when the entire copy member is maintained at the bias temperature $T_b$, the thermal gradient between the magnetic particles which are heated by the pulse of light and the copy member is no greater than $T_c-T_b$. Consequently the rate of cooling is increased with increasing contrast, and diffusion of the heat image is likewise minimized.

It is also possible to thermally bias magnetic material of the recording member with a flash of radiation from a second flash lamp. In one modification of the invention a second flash lamp is placed behind the recording member which consists of an opaque layer or stratum of the hard magnetic material held with a binder to a transparent support. The second flash lamp is employed to supply a pulse of energy which is generally uniform over the surface of the magnetic stratum at the same time as the magnetic stratum is imagewise heated by the first pulse of light modulated by the document. The second pulse of light momentarily heats the hard magnetic particles to the desired bias temperature during the imaging process. This method of biasing has the advantage that the support member is not substantially heated. Accordingly, the particles can cool quickly by thermal conduction to the support, with minimization of thermal diffusion and loss of image quality.

Similar conditions apply to other embodiments of the present invention, e.g., on imagewise heating an unmagnetized recording member in a magnetic field having a strength insufficient to magnetize the recording member at the bias temperature but exceeding the coercivity at some higher temperature.

The above described process produces a magnetic image in the recording member, that is to say regions of magnetization, of partial magnetization, and of demagnetization corresponding to the reflectivity or transmissivity of the document which is copied.

The process of the present invention does not require a complete gradation from fully magnetized areas to demagnetized areas in the image. All that is necessary is that a magnetic gradient be established with sensible levels of different magnetic strength in the exposed and unexposed areas. Depending on the type of working magnetic member, i.e., with respect to its particular saturation magnetization, coercivity, and remanence properties, and also the degree of sensitivity inherent in the sensing means being used, magnetic gradients carrying the desired message can be effectively read out with very little difference in magnetic signal strength between the unexposed and exposed areas. Desirably, of course, the change of magnetization will be as great as possible in the exposed areas. A further factor here, as is well known in the magnetic recording art, is that demagnetization does not have to occur throughout the entire thickness of the magnetic stratum. Thus surface demagnetization of a premagnetized member, or demagnetization only in partial depth of the magnetic stratum, can still afford a sensible magnetic gradient. Even when demagnetization is complete in the exposed areas throughout the entire depth of the magnetic stratum when such areas cool down below the Curie temperature thereof, a certain amount of regenerated magnetization will be apparent therein as a result of the field effect of the surrounding magnetic material in the nonexposed areas.

When the fine particles of hard magnetic material are magnetically oriented in the plane of the tape and parallel to each other, remagnetization takes place adjacent to the cool areas which are still magnetized so that the demagnetized area decreases. On the other hand, thermal diffusion tends to increase the area demagnetized so that, in the preferred embodiment in which a parallel oriented coat of premagnetized, preferably acicular, particles are imagewise demagnetized by exposure to light, the resolution can be greater than would be expected from thermal diffusion considerations.

In this application, the term "document" is used in a broad sense to mean anything which is capable of being imaged on the recording member and which contains an imagewise transmissivity or reflectivity gradient. More specifically, it is inclusive of any writing, book, half-tone, line screen, photograph, transparency, typewritten sheet, printed matter, etc.

Ordinarily a document will be readable by eye, that is, exhibit transmissivity or reflectivity gradients to visible light. Accordingly, electromagnetic radiation in the vicinity of visible range, which is hereinafter called "light," is employed in the imaging process.

As will be described in greater detail in the following, a most convenient light source in the power ranges needed and in the desirably fast exposures will be found in the high voltage, high intensity photographic flash lamps, and in particular in the xenon type, many varieties of which are available commercially. In one embodiment of this invention the light is modulated by transmission through a document. In this technique, the exposing radiation is modulated by an original containing text or message matter in varying degrees of absorptivity and transmissivity for the exposing radiation and will be physically disposed during the copying step between the source of the exposing radiation and the magnetized copy sheet. This technique involves placing an original containing text matter, imagewise transparent and opaque to the exposing radiation, in contact with a copy member and subsequently exposing the pair to the exposing radiation. The contact need not be absolutely perfect, but for reasons of improved fidelity and resolution, the more perfect the contact the higher the resolution and fidelity of the copied image.

Approximately 50% of the energy of the xenon flash lamps is in the visible, the other 50% is in the infrared. In copying the light noninfrared-absorbing colors, it is desirable to use filters removing a portion of this energy from the flash so that the magnetic copies correspond more nearly to the original document as seen by the human eye. Corning infrared filter 1–59 containing iron in the ferrous state is suitable for removing the undesired infrared radiation. This filter can be used to copy a wide variety of colors and colored images on white or colored papers. It permits copying such difficult colors as yellow pencil on white paper, a variety of ballpoint pen inks, and many other very difficult to copy images of low contrast. Further improvements in color copying can be obtained by using filters which peak the output of xenon flash in a particular region of the visible spectrum.

Another useful light source of high energy and short duration is the pulsed laser such as a ruby laser.

In general, in the reproduction of documents the pulse or flash of light is substantially uniform. However, by modulation of the pulse information can be added or subtracted from the recorded image. Similarly, the images of two or more documents can be combined on a single magnetic recording member by a successive exposure of first one document, then the second, or, provided the transmission of the assembly is sufficiently great, the recording member can be exposed to the radiation transmitted through both documents.

With electromagnetic radiation which is capable of being imaged by lenses, mirrors or the like, the episcopic method of imaging can be used. In this method, the document can be exposed to the pulse of radiation, and the image formed by selective reflection focussed by a lens on the surface of the recording member. The image can be larger or smaller than the original. Because of the high recording density possible with the magnetic recording members, the process is highly useful for the storage of information contained on documents at a size reduction of 25/1 or more.

The recording member on which the image of the document is recorded is characterized by two fundamental requirements: (1) it must contain a support member, which may be rigid or flexible, opaque or transparent, and (2) it must contain a hard magnetic stratum which may be in and/or on the surface of the just described support member. The only critical requirements concern the properties of the magnetic stratum. This stratum has to consist of fine, preferably acicular, particulate, preferably single domain, hard magnetic material. Desirably the magnetic material will be in a polymeric binder which is of low or poor heat conductivity to adhere the magnetic material to itself and to the support.

Desirably, the material capable of magnetization to the hard, magnetic state will be of particle size of one micron or under, although particles having a maximum dimension as large as 10 microns such as the chromium dioxide particles described by Arthur in U.S. Pat. 2,956,955 can be used. Such particles tend to agglomerate and, accordingly, frequently the individual unit dimensions of any one magnetizable area will have agglomerates possibly in the range up to 10 mils. In recording and copying techniques, the resolution is a function of the particle size of the working component involved. The smallest unit which can be charged magnetically is a domain, and in small particles the size of the domains is limited by the particle size. Accordingly, the smaller and more uniform the particle size of the material to be magnetized, the better. Preferably, these particles should have a maximum dimension in the range 0.01 to 5 microns, and most especially 0.1 to 2.0 microns. The particulate nature of the magnetic material also serves to limit the spread of the heat image by thermal diffusion, particularly when the particles are bound together and to the support with a binder of relatively low thermal conductivity.

The final thickness of the stratum of the material to be magnetized and the low-heat-conductivity binder when used is not especially critical. For maximum resolution, this stratum should preferably be from 0.01 to 5.0, and most preferably 0.05 to 2.0 mils thick.

Shape anisotropy, or magnetocrystalline anisotropy, can be used in the preparation of the recording members to obtain a preferred orientation of the magnetic particles either in the place of the coating, or perpendicular to the surface of the tape if the latter is so desired to give a greater demagnetizing penetration of the plate or film for copying.

The magnetic particles can be aligned with their magnetic axes perpendicular to the plane of the member by forming a stratum of magnetic material in a hardenable liquid binder on the support, and exposing the member to a magnetic field directed perpendicularly while the binder hardens. The binder can be a solvent coating composition which is hardened by evaporation of the solvent. The binder can also be a thermoplastic material which melts below the Curie temperature of the magnetic material.

Similarly, for parallel orientation, i.e., in the coated direction, the cast coating, whether by solvent or by thermoplastic technique, before setting is drawn directly across the pole pieces of a magnet oriented with the field axes thereof in the line of flow of tape movement.

The hard magnetizable material must be capable of magnetization such that it exhibits an energy product $(BH)_{max}$ of 0.08–8.0 gauss oersteds$\times 10^6$, a remanence $B_\sigma$ of 500–21,500 gauss, a coercivity $H_c$ of 40–6000 oersteds, and a Curie-point temperature below 1200° C., preferably from 25° to 500° C. Desirably the magnetizable material should also have as high a saturation magnetization, i.e., $\sigma$, as is possible consonant with the just recited desirable property range.

A particularly outstanding species of the magnetic component genus which can be used in making the recording member for use in the present invention is chromium dioxide ($CrO_2$). This material can be used in substantially pure form, or modified with one or more reactive elements. The term chromium dioxide as used in this application is specifically inclusive of the pure form and the modified forms. Suitable descriptions of both the process of preparation and the compositions which have the necessary properties will be found in the following illustrative list of issued U.S. patents: Arthur U.S. 2,956,955, Arthur and Ingraham U.S. 3,117,093, Cox U.S. 3,074,778, U.S. 3,078,147, U.S. 3,278,263, Ingraham and Swoboda U.S. 2,923,683, U.S. 2,923,684, U.S. 3,034,988, U.S. 3,068,176 and Swoboda U.S. 2,923,685. For pure $CrO_2$ the Curie temperature is near 119° C. This varies somewhat depending on the modifiers used in the synthesis of $CrO_2$, but Curie temperatures in the range of 70° C.–170° C. are easily attainable with modified $CrO_2$.

Other magnetic materials which can be employed include $\chi$-iron carbide and $\gamma Fe_2O_3$.

Chromium dioxide has a relatively low Curie temperature, and when in the desired particulate form has a relatively high coercivity and a relatively high remanence. Finely particulate chromium dioxide further absorbs light uniformly throughout the region of the visible spectrum, i.e., it is black to the exposing light.

The nature of the support on which the magnetizable stratum is coated can vary widely through such a range as from glass, to metals, to flexible polymers. Because of the easier and wider handleability, and therefore greater desirability, the preferred substrates are the flexible polymeric ones.

In applications when the imaging light is incident on a stratum of magnetic material on or in the surface of the the support, the nature of the support is not important. However, when an opaque substantially continuous stratum of the hard magnetic material is biased by a second flash of light from behind the recording member, the support should be transparent to light.

In general, the magnetic material is disposed in a substantially continuous stratum opaque to the exposing light on the surface of the support to form the recording member. Recording can, however, be achieved by the direct method of the present discovery on copy members in which the magnetic material is discontinuously disposed on the surface of the member; and which are particularly adapted for reflex copying as described in my copending application Ser. No. 682,234, filed Nov. 13, 1967, which is a continuation-in-part of application Ser. No. 636,728, filed May 8, 1967, now abandoned, and of application Ser. No. 410,007, filed Nov. 9, 1964, now abandoned. Reflex recording members are described more fully in my copending application Ser. No. 636,955, filed May 8, 1967, now abandoned; Ser. No. 682,232, filed Nov. 13, 1967; and Ser. No. 682,233, filed Nov. 13, 1967.

In one form of reflex recording member, the magnetic material is distributed in the form of agglomerates of the ultimate magnetic particles randomly on the surface of the recording member. In another, more preferred form, the magnetic material is bound in a pattern of dots or lines preferably in indentations which are engraved or embossed in the transparent support.

The magnetic image can be read out by a variety of methods which will be apparent to those skilled in the art. Included are magnetic reproduction heads (such as those employed in magnetic tape recorders), magnetic toners and inks and magnetooptic methods.

Magnetic inks consist of fine magnetic particles such as black iron oxide dispersed in a suitable fluid medium. The ink particles are attracted by the magnetic field of the magnetized portion of the image and can then be transferred to paper.

Magnetic toners likewise contain a magnetic pigment generally encapsulated in a fusible binder. The magnetic toner can be dispersed in a liquid. The magnetic image on the recording member is then treated with the dispersion. Upon removal of excess dispersion the magnetic image becomes visible by virtue of the pigment adhering to the magnetized areas. This process can suitably be described as decoration of the magnetic image. The toner image adhering to the magnetic recording member can then be transferred to paper or the like by pressure. The toner image on the paper can then be rendered more permanent by fusion of the encapsulating binder. It will be evident that the process can be repeated to form as many copies as desired.

Ink or toner read out is particularly applicable to the embodiment of this invention in which a premagnetized recording member is imagewise demagnetized or in which an unmagnetized recording member is imagewise magnetized.

Read out can also be effected magnetooptically for example as described in Baaba et al., U.S. Pat. 3,229,293.

The embodiment of this invention in which a magnetic image of opposite polarity is formed on a premagnetized member is particularly adapted to magnetooptic read out.

Another method of reading out the magnetic image is by use of a magnetic tape viewer such as that described in U.S. Pat. 3,013,206.

In general, the read out depends on the magnetic field rather than the state of magnetization of the recording member. Magnetically or physically prestructuring the recording member can in many instances significantly improve the read out. Physically prestructured members have been described hereinabove. Magnetic prestructuring of continuously coated recording members can be achieved by a variety of techniques such as by recording a sine wave or a square wave, on the recording member. A sine wave produces a magnetic field proportional to the magnetization. A square wave gives the greatest field strength for a given change in magnetization. It will be apparent that the spatial frequency of the prestructuring, whether physical or magnetic, should be greater than the highest spatial frequency of the information which is to be imaged on the prestructed recording member. Thermal imaging can also be employed to prestructure a recording member magnetically. When a separate flash lamp is employed to bias the recording member, prestructuring and bias can be accomplished at the same time by use of a suitable structured transparency between the second, biasing flash and the recording member. The use of prestructuring, either in physical form or by impression of a pattern of magnetic gradients on a recording member prior to forming an image thereon, is generally applicable to all forms of thermomagnetic recording including the reflex technique described in my copending application Ser. No. 682,234.

In the embodiment of this invention in which a premagnetized recording member is imagewise demagnetized, prestructuring offers a further advantage. In this embodiment resolution is limited by remagnetization of the regions of the heated areas adjacent to the cool magnetic areas. Prestructuring the recording member significantly reduces such remagnetization, and substantially higher resolution can be achieved with prestructured recording members.

In all of the embodiments of this invention the magnetic imaging process is non-cumulative, that is exact repetition of the heating and cooling steps does not change the magnetic image.

SPECIFIC EMBODIMENTS OF THE INVENTION

The following examples in which the parts given are by weight are submitted to illustrate the invention further, but not to limit it.

EXAMPLE I

Part A.—Preparation of $CrO_2$: A typical preparation, as described in Cox U.S. Pat. 3,278,263, of a magnetic $CrO_2$ species involved the precipitation of $Cr_2O_3$ hydrate from a dilute solution of chromium nitrate using dilute ammonium hydroxide solution. The resultant precipitate was removed by filtration and air-dried to an approximate formula $Cr_2O_3 \cdot 9H_2O$. The product was dehydrated by heating in a muffle furnace at 600° C. for 2 hours. A blend was prepared of 23 g. of the thus-dried $Cr_2O_3$, 34.5 g. of $CrO_3$ crystals, and 14.4 cc. of water, which blend was then sealed in a platinum tube. The tube was heated at 300° C. under 1,000 atmospheres pressure for 8 hours. The tube was then cooled and opened, and the resulting $CrO_2$ product removed, washed repeatedly with water on the filter, dried in acetone, and finally pulverized in an agate mortar. The magnetic properties of the thus-obtained $CrO_2$ product exhibited a coercivity of 240 oersteds, a saturation magnetization of 85 emu/g. measured at 4400 oersteds and 25° C., and a remanence ratio of 0.38.

Part B.—Preparation of an opaque, pressure-clarifiable master film (OPC film): In accord with the general disclosures in U.S. Pat. 2,957,791, a solution was prepared from 10 parts of a commercially available, moderately low molecular weight polyvinyl chloride, 30 parts of a commercially available pentaerythritol abietate, one part of a commercially available polymeric epoxy plasticizer, 57 parts of dimethylacetamide, and 1.8 parts of water. The solution was cast at 40–50° C. with a doctor knife at 3-mil thickness setting at 45% R.H. onto a commercially available, 2-mil poly(ethylene terephthalate) film, and after casting, the topcoated film was immersed at once in water at 20° C. After washing out the dimethylacetamide and drying in air, the composite film had a thickness of 3.3–3.4 mils, i.e., 2-mil substrate and 1.3–1.4 mils OPC topcoat, and a white density, as measured on a Welch Densichron®, of 0.62–0.63.

Part C.—Preparation of OPC message film: An OPC film as described in Part B was placed in a standard IBM Executive Model electric typewriter and printed without a ribbon at a pressure setting of 6A, using a special key with a key face 200 mils high and 4½ mils wide which served to simulate a coded information pattern. The transmission optical density, as measured by a Welch Densichron® using white light, was 0.65 in the background areas and 0.05 in the typed (clarified) regions.

Part D.—The preparation of $CrO_2$ magnetic image receptor member: A sample of $CrO_2$, prepared as described in general in Part A, with a saturation magnetization of 86 emu/g. measured at 4400 oersteds and 25° C., was ball-milled in water to break up aggregates, washed, and dried. A coating mixture was prepared by kneading in a polyethylene bag 10 parts of the just-described, powdered $CrO_2$, 10 parts of a commercially available, high molecular weight poly(vinyl chloride), 2 parts of a commercially available polymeric epoxy plasticizer-stabilizer, 5 cc. of cyclohexanone, and 15 cc. of tetrahydrofuran. The resultant composition was then milled on a 6″ rubber mill using additional tetrahydrofuran to maintain a desirable milling consistency until the $CrO_2$ was completely incorporated into the solvent-plasticized polyvinyl chloride. There was thus obtained a plastic, flexible polymeric sheet weighing 23.5 parts. This sheet was then dissolved in 75 parts of tetrahydrofuran and the resultant suspension cast on a 1-mil poly(ethylene terephthalate) film base using a doctor knife setting of 2 mils. The cast film was then air-dried and resulted in a 0.3 mil coating of the dispersed $CrO_2$ on the poly(ethylene terephthalate) film base.

Part E.—Preparation of imagewise demagnetized $CrO_2$ record: A sample of the just-described flexible tape support carrying a dispersion of $CrO_2$ in poly(vinyl chloride) was premagnetized with 3750 cycle/second signal recorded on a magnetic tape recorder operated at full input volume and at a tape transport speed of 7½ inches/second.

An Ultrablitz Cornet M photographic electronic flash unit was placed so the flash tube was located about 1¼ inches from the imagewise clarified OPC film (Part C) in planar coating/coating contact with the $CrO_2$ film (Part D).

The 230 $\mu$f. capacitor in the Ultrablitz Cornet M flash unit was charged to 320 volts. The flash unit was then discharged and radiant energy from the flash tube passed through the typed (i.e., clarified) regions of the OPC film to a much greater extent than through the background regions. The radiant energy was absorbed by the $CrO_2$ particles in the $CrO_2$ film.

The amplitude of the output signal of the 3750 cycle/second recording on the $CrO_2$ film prior to exposure to the intense radiant energy was 210 millivolts. After exposure to the radiant energy, the amplitude had decreased to 20 to 30 millivolts in the regions of the $CrO_2$ film corresponding to the typed line, but was unchanged in the background region.

EXAMPLE II

A photographic transparency of a resolution chart test pattern having a transmission optical density of 0.04 in the transparent regions and 3.5 in the line and letter regions as measured on a Welch Densichron® using white light, was placed in contact with a $CrO_2$ film as in Example I, Part D. The $CrO_2$ film had been premagnetized in a 1000 gauss field.

An Ultrablitz Cornet M flash unit (capacitance=230 $\mu$f.) was charged to 320 volts and placed with the flash tube 1¼ inches from the photographic negative. The flash unit was discharged and the radiant energy was absorbed by the $CrO_2$ film in an imagewise manner.

The exposed $CrO_2$ film was then dipped in Visimag® type F, a commercially available powder suspension, which consists of small particles of ferromagnetic material in a hydrocarbon solvent. After the solvent evaporated from the surface of the $CrO_2$ film, particles of the ferromagnetic material in Visimag® were adhering to the $CrO_2$ film in those regions which corresponded to the line and letter regions of the photographic transparency, i.e., the non-exposed regions.

The thus imagewise-coated $CrO_2$ film was then pressed against a commercially available transparent plastic sheet coated on one face with a commercially available adhesive, i.e., a transparent pressure-sensitive adhesive film, with the adhesive face being placed in contact with the Visimag® image. Simple pressure resulted in the transfer of the Visimag® image from the $CrO_2$ film to the plastic adhesive-coated film whereupon the films were separated manually. The adhesive coated film with the transferred image was then placed image down (to assure right reading) on a sheet of white paper to afford background contrast. The resultant composite was a faithful image in good detail and high resolution of the original photographic transparency resolution sheet.

EXAMPLE III

Contact imaging with magnetic read out

Part A.—Preparation of $CrO_2$-containing film: A 6.25-part sample of the $CrO_2$ described in Example I, Part A, was demagnetized and combined with 19 parts of a 60/40 by volume mixture of xylene and n-butanol, 1.9 parts of a 20% by weight solution of a commercially available polyvinyl butyral resin in the 60/40 by volume mixture of the xylene and n-butanol, 0.060 part of a commercially available wetting agent (dioctyl sodium sulfosuccinate—Aerosol OT), and 0.060 part of stearic acid. The resultant mixture was ball-milled for 72 hours using glass beads, at the end of which time 8.6 additional parts of the previously disclosed 20% polyvinyl butyral was added, and milling was continued for an additional 24 hours.

The resultant $CrO_2$/polyvinyl butyral slurry was coated on a glass plate with a doctor knife set at 5 mils. The wet film was placed between opposing poles of a 6″ diameter electric magnet and a field of 400 gauss was applied while the film was drying. A backing layer of cellulose acetate was then applied by topcoating to a thickness of approximately 1 ml. dry weight from acetone solution. After air-drying, the topcoated composite was heated in an oven at 95° C. The resultant composite film was removed from the glass substrate by soaking in a water bath. The wet composite film was clamped in a frame to prevent shrinkage during drying.

Part B.—Imaging and read out: A sample of the just-described polyvinyl butyral-containing $CrO_2$ film on a cellulose acetate substrate (Part A) was fed through a magnetic tape recorder and a 1,000 cycle/second signal was impressed thereon using a Hewlett Packard Signal generator operating the recorder at 7½"/second. The amplitude of the recorded signal was equal to 4 volts. An Ultrablitz Meteor SP electronic flash unit of 600 μf. capacitance was held so that the flash tube was ½" from a portion of the tape. The flash unit was charged to 500 volts and discharged. On checking the amplitude of the magnetic signal remaining on the film, the magnetic signal in those portions which had been exposed to the flash were found to have become extremely erratic and had a maximum amplitude of 0.15 volt.

EXAMPLE IV

A charge of 10 parts $\gamma$-$Fe_2O_3$ powder and 15 parts of a polyamide-acid prepared from pyromellitic anhydride and bis(4-aminophenyl) ether in accord with U.S. Pat. 3,179,-614 and about 295 parts of dimethylacetamide was ball-milled at room temperature for 4 hours. The resultant $\gamma$-$Fe_2O_3$ dispersion was then cast on 2-mil thick polypyromellitimide film as described in U.S. Pat. 3,179,634 and the cast dispersion was then cured, i.e., the polyamide-acid polymer of the dispersion was converted to a polypyromellitimide similar to the base film, under an infrared lamp and an infrared gun resulting in a dry base coating of the dispersed $\gamma$-$Fe_2O_3$ approximately 0.5 mil thick. The combined film, i.e., the support and the dried $\gamma$-$Fe_2O_3$ stratum, was then substantially uniformly magnetized in a D.C. field.

A mask with a series of ¼" diameter holes was placed over the $\gamma$-$Fe_2O_3$ coating. A General Electric Model FT–91/L xenon photographic flash tube was placed ⅛" over the mask. The 160 μf. capacitor bank of the flash unit was charged to 1000 volts and discharged through the xenon tube. After this exposure, which was extremely short in duration, the region of the $\gamma$-$Fe_2O_3$ stratum corresponding to the holes in the mask were much darker in color than the regions corresponding to the mask itself. The thus exposed film was dusted with a fine iron powder (General Aniline and Film Company, type L carbonyl iron) and shaken lightly to remove excess powder. The iron powder adhered to all areas of the film except those corresponding to the ¼" diameter holes in the mask, i.e., those which, as described above, had become appreciably darkened. Thus, the areas of the premagnetized $\gamma$-$Fe_2O_3$ stratum open to the radiation of the xenon tube, i.e., exposed, had become demagnetized.

The thus-exposed and developed film was again substantially, completely and uniformly remagnetized in a D.C. field and dusted with the same fine iron power. The powder now adhered to the film surface uniformly. The iron particles were removed. The mask with the ¼" diameter holes was again placed over the remagnetized surface and the xenon flash tube was discharged as before. The film was again dusted with the same fine iron powder and again this adhered to the film except in the regions thereof corresponding to the ¼" diameter holes in the mask, i.e., the exposed areas.

EXAMPLE V

A $CrO_2$ tape having a continuous 80 microinch thick coating of $CrO_2$ in a binder on a 1½ mil substrate of Mylar® was magnetized by passing over the pole piece of a permanent magnet. A Ronchi ruling having 10,000 equal opaque and clear spaces per inch was placed over the magnetic tape. The tape was placed in a solenoid giving a field of 200 gauss in the plane of the tape directed 180° from the original direction of magnetization, i.e., reverse magnetic field bias. The film was exposed through the Ronchi ruling to light energy from a ruby laser. After exposure, the tape was played back on a tape recorder and the output displayed on a cathode ray tube to show an output corresponding to 10,000 reversals per inch. This corresponds to a resolution of 1.2 microns.

EXAMPLE VI

Episcopic projection of magnetic images was carried out as follows:

A printed test pattern with an optical density of 1.4 in the black area and 0.10 in the white unprinted area was used as an exposure target. This image was illuminated by an FT–91/L xenon flash tube in an elliptical reflector fashioned from "Alzac" aluminum. The aperture of the reflector was 2" and the depth of the reflector was 1", with the xenon flashtube located at the focal point. The axis of the flash lamp was a perpendicular distance of 2¾" from the printed target, and the lamp was positioned to illuminate this target at an angle of 45°. The xenon flashtube was subjected to an energy discharge of 190 microfarads at about 1000 volts. The image of the test pattern was projected through an Erfle eyepiece containing 3 achromats with a combined focal length of 32 mm. onto a magnetized chromium dioxide film. The distance from the target to the Erfle eyepiece was 5⅛". Thickness of the Erfle eyepiece was 2⅛".

The chromium dioxide film was made by embossing a 3-mil cellulose acetate film with a 500 dots per inch pattern. The thus-formed, dot pattern was filled with a chromium dioxide ink containing 50 parts of chromium dioxide and 50 parts of a commercial alkyl binder milled together for 4 passes on a 3-roll ink mill at 300–350 lbs. per inch front to rear pressures. The cellulose acetate dot film was filled with this ink and cured in a perpendicular 2000 gauss field to orient the chromium dioxide particles. After curing, the surface was cleaned with tissue paper. Before use, this film was magnetized in a 2500 gauss D.C. field. The film was preheated to 110° C. at the time of exposure. The exposed film was developed by immersion in a dispersion of carbonyl iron in Freon® 113. After the Freon® was allowed to evaporate, the reduced image of the test pattern was transferred to paper using Mylar®-coated adhesive tape. The size reduction was approximately 4 to 1 diameters with good resolution and fidelity.

EXAMPLE VII

Episcopic imaging was carried out by the following procedure:

The image target was illuminated by light coming from twin xenon lamps (XF5–A9, Edgerton, Germeshausen and Grier, Inc.) 9" long located in aluminum reflectors symmetrically placed on each side of the 1" illuminated slit. The lamps were positioned so that they were not able to see the projection lens directly. The projection lens was an $f$0.95, 50 mm. focal length lens mounted in an adaptor on a 35 mm. camera with its back removed. A film carrying a continuous coating of $CrO_2$/binder formulation magnetized with an A.C. bar pattern of 2000 bits/inch was located in the focal plane of the camera back and was held in position on a glass slide. Thermal biasing was carried out by exposure from the back side of the film using a Cornet Model 220 Ultrablitz, 80 watt seconds xenon flash. The heat biasing pulse was about 10 microseconds duration while the main illuminating pulse was 300 microseconds. The bias pulse was found to have its maximum effectiveness when applied on the decreasing part of the signal pulse. The main flash exposure was carried out by operating each xenon lamp at its 600 Joule capacity. The energy density on the target was 1.5–1.8 Joules/sq. cm. Note that paper darkens and discolors at approximately 1.9 Joules/sq. cm. The exposure slit was 1" wide by 8½" long. It was also found that a heat bias applied by a xenon flash to the front side of the chromium dioxide film was advantageous. In this case the rear bias was omitted and the front side bias was carried out using twin FX–12–0.38 (0.38" long E. G. and G.) xenon lamps. Successful opaque projection at 15:1 to 25:1 reduction was carried out by these methods. The recorded images on the $CrO_2$ were made visible by decoration with Visimag® ink or by examination with magnetooptical viewers.

EXAMPLE VIII

An iron oxide (99.0% $Fe_2O_3$) ink was prepared by mulling for 300 passes on a mechanical muller a mixture of 4 parts of a fine, commercially available iron oxide of $H_c$ 260 oersteds, one part of a commercially available, long-oil linseed alkyd of acid value 6–10, and 3 parts of Stoddard solvent. The resultant thick ink was used to fill the lines of a 25 sq. in. commercially available polycarbonate film, which had been embossed with a line pattern of 500 l.p.i. The thus-filled sheet was dried for 2 days under atmospheric conditions and the surface then cleaned and polished with a fine alumina abrasive. Finally, the polished sheet was dried at 55° C. under reduced pressure. The resultant matrix master was magnetized by pulling over the edge of a highly magnetized steel plate.

The resultant magnetized line matrix master was placed face to face with a 5-mil thick poly(ethylene terephthalate) film carrying a layer of $CrO_2$ in a polyvinylidene chloride binder, said $CrO_2$ exhibiting an $H_c$ of 314 oersteds, and the two were heated under 200 pounds pressure between squared, smooth, aluminum plates in a Carver press at 130° C. for 2 minutes and the assembly then cooled rapidly with cold water. This pressing temperature is above the Curie temperature of the $CrO_2$, and, by cooling down through the Curie temperature in contact with the $\gamma$-$Fe_2O_3$ line master reflex matrix, a corresponding line magnetic image was formed in the $CrO_2$ layer.

The magnetized line $CrO_2$ plate was selectively demagnetized by contact exposure through a positive transparency containing both line and halftone copy at 80° C. using xenon exposure lamp at 1000 volts and 190 $\mu$f. The thus-exposed $CrO_2$ film was coated with a dilute methanol-water solution of partially hydrolyzed polyvinyl acetate to impart hydrophilic character. The coating was air-dried and then heated several hours at 50° C. The coated, exposed $CrO_2$ film was dipped into a slurry of an $Fe_3O_4$/fusible thermoplastic polymer-coated toner in methanol for 30 seconds. The thus-developed sheet was washed gently with methanol, air-dried, and placed momentarily on a metal surface at 150° C. to fuse the hydrophobic toner to the $CrO_2$ film. The $CrO_2$ film was placed on a Davidson Litho-Duplicator and used as a printing plate with regular litho-ink, offset blanket, and water-roll. The to-be printed areas were wet by the oil-based ink and the background, kept moist by the hydrophilic surface, was free of ink. The ink was transferred to a rubber blanket and thence to paper. The imaging obtained on a good commercial grade of lithopaper gave a print of the test of the original positive showing good resolution and fidelity in both letter and halftone areas.

In other tests, a poly(ethylene terephthalate) substrate carrying the $CrO_2$ stratum was given a bit pattern from an iron oxide tape which had been signalled to 533 bits/in. using a tape recorder. The transfer of signal was accomplished by contacting surfaces under pressure and heating through the Curie point with subsequent cooling following the procedures described above. The $CrO_2$ film bearing the 533 bits/in. magnetic pattern was then contact exposed through a transparency as above. The image was developed as above and transferred by heat and pressure to standard imaging paper, normally used on A. B. Dick duplicators. The imaging paper having the fused toner on it was placed on the Davidson Litho-Duplicator, washed with the prescribed etchant to remove the protective coating and to make the background hydrophilic. Printing was carried out as above.

EXAMPLE IX

A molybdenum sheet 1 mil thick was coated with a photoresist and exposed to a dot pattern of 750 dots per inch. Unexposed photoresist was washed out and molybdenum was etched out of these areas to leave depressions or wells approximately 0.3 mil deep in the surface of the molybdenum film. These were filled with a chromium dioxide/alkyd binder (Aroplaz 1271) combination. The filled film after cleaning of excess cured binder was magnetized by passing over the poles of a permanent magnet and imagewise demagnetized through a photographic transparency using a xenon flash lamp at 0.35 J./sq. cm. starting from room temperature or 0.15 J./sq. cm. using a heat bias to 80° C. The image was easily developed or made visible with magnetic toner.

The embodiments of the invention in which an exclusive property or privilege is claimed are defined as follows:

1. A thermomagnetic recording process which comprises:

(i) placing a document having a message defined by areas of differing transmissivity to light between a light source and a recording member;

(ii) exposing the recording member to a flash of light from said source having a duration less than 10 milliseconds through said document, said magnetic recording member comprising particulate magnetic material capable of being magnetized to a hard magnetic state in a stratum bound to a support, the particles of said material having a particle size with a maximum dimension in the range of 0.01 to 10 microns, the intensity and duration of said flash being sufficient to raise the temperature of said particles imagewise above a transition temperature defined by the lower temperature limit of a magnetic transition in accordance with the modulation of the light by transmission through the document under magnetic conditions which change the magnetic state of the said material on heating and cooling through said transition temperature while the remainder of said magnetic recording member is maintained at a temperature below said transition temperature; and (iii) cooling the particles below the transition temperature and thereby fixing the magnetic image.

2. Process of claim 1 in which the stratum of magnetic material is opaque to the light and is bound to a support transparent to light, said particles being thermally biased to a temperature below the transition temperature by a second flash of light through the back of said support while exposed to modulated radiation transmitted through said document.

3. Process of claim 1 in which said stratum has a thickness of 0.01 to 5 mils.

4. Process of claim 3 in which the stratum of magnetic material is opaque to the light and is bound to a support transparent to light, said particles being thermally biased to a temperature below the transition temperature by a second flash of light through the back of said support while exposed to modulated radiation transmitted through said document.

5. Process of claim 3 in which the magnetic material is chromium dioxide.

6. Process of claim 5 in which the stratum of magnetic material is opaque to the light and is bound to a support transparent to light, said particles being thermally biased to a temperature below the transition temperature by a second flash of light through the back of said support while exposed to modulated radiation transmitted through said document.

7. Process of claim 3 in which the magnetic recording member is premagnetized and the intensity and duration of the flash of light are sufficient to raise the temperature of said particles imagewise into the Curie range of temperature.

8. Process of claim 7 in which the stratum of magnetic material is opaque to the light and is bound to a support transparent to likht, said particles being thermally biased to a temperature below the transition temperature by a second flash of light through the back of said support while exposed to modulated radiation transmitted through said document.

9. Process of claim 7 in which the magnetic material is chromium dioxide.

10. Process of claim 9 in which the stratum of magnetic material is opaque to the light and is bound to a support transparent to light, said particles being thermally biased to a temperature below the transition temperature by a second flash of light through the back of said support while exposed to modulated radiation transmitted through said document.

11. Process of claim 7 in which the magnetic stratum is magnetically prestructured.

12. Process of claim 11 in which the stratum of magnetic material is opaque to the light and is bound to a support transparent to light, said particles being thermally biased to a temperature below the transition temperature by a second flash of light through the back of said support while exposed to modulated radiation transmitted through said document.

13. Process of claim 3 in which the magnetic recording member is exposed to said flash of light in a magnetic field, the intensity and duration of said flash being sufficient to raise the temperature of said particles imagewise to a temperature above which the said magnetic field exceeds the coercivity of said particles.

14. Process of claim 13 in which the stratum of magnetic material is opaque to the light and is bound to a support transparent to light, said particles being thermally biased to a temperature below the transition temperature by a second flash of light through the back of said support while exposed to modulated radiation transmitted through said document.

15. Process of claim 13 in which the magnetic recording member is premagnetized in the opposite polarity to the polarity of the magnetic field.

16. Process of claim 15 in which the stratum of magnetic material is opaque to the light and is bound to a support transparent to light, said particles being thermally biased to a temperature below the transition temperature by a second flash of light through the back of said support while exposed to modulated radiation transmitted through said document.

17. Process of claim 15 in which the magnetic material is chromium dioxide.

18. Process of claim 17 in which the stratum of magnetic material is opaque to the light and is bound to a support transparent to light, said particles being thermally biased to a temperature below the transition temperature by a second flash of light through the back of said support while exposed to modulated radiation transmitted through said document.

19. Process of claim 13 in which the magnetic material is chromium dioxide.

20. Process of claim 19 in which the stratum of magnetic material is opaque to the light and is bound to a support transparent to light, said particles being thermally biased to a temperature below the transition temperature by a second flash of light through the back of said support while exposed to modulated radiation transmitted through said document.

21. Process of claim 9 in which the magnetic stratum is magnetically prestructured.

22. Process of claim 21 in which the stratum of magnetic material is opaque to the light and is bound to a support transparent to light, said particles being thermally biased to a temperature below the transition temperature by a second flash of light through the back of said support while exposed to modulated radiation transmitted through said document.

23. Process of claim 3 including the additional step of reading out the magnetic image.

24. Process of claim 23 in which the read-out is accomplished magneto-optically.

25. Process of claim 23 in which the read-out is accomplished by means of a magnetic toner or magnetic ink.

26. Process of claim 25 in which the read-out is repeated.

27. Process of claim 3 in which a plurality of transparencies are used to modulate the light.

28. Process of claim 27 including the additional step of reading out the magnetic image.

29. A thermomagnetic recording process which comprises:

(i) illuminating a document substantially uniformly with a flash of light having a duration of less than 10 milliseconds;

(ii) focussing the light modulated by reflection from the surface of said document with a lens onto the surface of a magnetic recording member, said magnetic recording member being composed of particulate magnetic material capable of being magnetized to a hard magnetic state in a stratum bound to a support, the particles of said material having a particle size in the range 0.01 to 10 microns, the intensity and duration of said flash of light being sufficient to raise the temperature of said particles imagewise above a transition temperature defined by the lower temperature limit of a magnetic transition under magnetic conditions which change the magnetic state of the said magnetic material on heating and cooling through said transition temperature, while the remainder of the said recording member is maintained at a temperature below the said transition temperature; and (iii) cooling the particles below the transition temperature and thereby fixing the magnetic image.

30. Process of claim 29 in which the stratum of magnetic material in opaque to the light and is bound to a support transparent to light, said particles being thermally biased to a temperature below the transition temperature by a second flash of light through the back of said support while exposed to modulated radiation transmitted through said document.

31. Process of claim 29 in which said stratum has a thickness of 0.01 to 5 mils.

32. Process of claim 31 in which the stratum of magnetic material is opaque to the light and is bound to a support transparent to light, said particles being thermally biased to a temperature below the transition temperature by a second flash of light through the back of said support while exposed to modulated radiation transmitted through said document.

33. Process of claim 31 in which the magnetic recording member is premagnetized and the intensity and duration of the flash of light is sufficient to raise the temperature of said particles imagewise into the Curie range of temperature.

34. Process of claim 33 in which the stratum of magnetic material is opaque to the light and is bound to a support transparent to light, said particles being thermally biased to a temperature below the transition temperature by a second flash of light through the back of said support while exposed to modulated radiation transmitted through said document.

35. Process of claim 31 in which the magnetic material is chromium dioxide.

36. Process of claim 35 in which the stratum of magnetic material is opaque to the light and is bound to a support transparent to light, said particles being thermally biased to a temperature below the transition temperature by a second flash of light through the back of said support while exposed to modulated radiation transmitted through said document.

37. Process of claim 31 in which the magnetic recording member is exposed to said flash of light in a magnetic field, the intensity and duration of said flash being sufficient to raise the temperature of said particles imagewise to a temperature above which the said magnetic field exceeds the coercivity of said particles.

38. Process of claim 37 in which the stratum of magnetic material is opaque to the light and is bound to a support transparent to light, said particles being thermally biased to a temperature below the transition temperature by a second flash of light through the back of said support while exposed to modulated radiation transmitted through said document.

39. Process of claim 37 in which the magnetic material is chromium dioxide.

40. Process of claim 39 in which the stratum of magnetic material is opaque to the light and is bound to a support transparent to light, said particles being thermally biased to a temperature below the transition temperature by a second flash of light through the back of said support while exposed to modulated radiation transmitted through said document.

41. Process of claim 37 in which the magnetic recording member is premagnetized in the opposite polarity to the polarity of the magnetic field.

42. Process of claim 41 in which the stratum of magnetic material is opaque to the light and is bound to a support transparent to light, said particles being thermally biased to a temperature below the transition temperature by a second flash of light through the back of said support while exposed to modulated radiation transmitted through said document.

43. Process of claim 41 in which the magnetic material is chromium dioxide.

44. Process of claim 43 in which the stratum of magnetic material is opaque to the light and is bound to a support transparent to light, said particles being thermally biased to a temperature below the transition temperature by a second flash of light through the back of said support while exposed to modulated radiation transmitted through said document.

45. Process of claim 33 in which the magnetic material is chromium dioxide.

46. Process of claim 45 in which the stratum of magnetic material is opaque to the light and is bound to a support transparent to light, said particles being thermally biased to a temperature below the transition temperature by a second flash of light through the back of said support while exposed to modulated radiation transmitted through said document.

47. Process of claim 33 in which the magnetic stratum is magnetically prestructured.

48. Process of claim 47 in which the stratum of magnetic material is opaque to the light and is bound to a support transparent to light, said particles being thermally biased to a temperature below the transition temperature by a second flash of light through the back of said support while exposed to modulated radiation transmitted through said document.

49. Process of claim 45 in which the magnetic stratum is magnetically prestructured.

50. Process of claim 49 in which the stratum of magnetic material is opaque to the light and is bound to a support transparent to light, said particles being thermally biased to a temperature below the transition temperature by a second flash of light through the back of said support while exposed to modulated radiation transmitted through said document.

References Cited

UNITED STATES PATENTS

| | | | |
|---|---|---|---|
| 2,793,135 | 5/1957 | Sims et al. | 346—74X |
| 3,094,699 | 6/1963 | Supernowicz | 346—74 |
| 3,164,816 | 1/1965 | Chang et al. | 346—74X |
| 3,457,070 | 7/1969 | Watanabe et al. | 346—74X |

BERNARD KONICK, Primary Examiner

G. M. HOFFMAN, Assistant Examiner

U.S. Cl. X.R.

117—238; 179—100.2; 340—174.1